United States Patent Office 3,035,063
Patented May 15, 1962

3,035,063
PROCESS FOR MAKING 3,4-METHYLENEDIOXY-
PHENYL - 1 - POLYALKOXY - THIO-ALKYL AND
POLYALKOXY-METHYL ETHERS
Oscar F. Hedenburg, Pittsburgh, Pa., assignor to Rex Research Corporation, Toledo, Ohio, a corporation of Delaware
No Drawing. Filed July 20, 1960, Ser. No. 44,010
7 Claims. (Cl. 260—340.5)

This invention relates to chemical compounds especially valuable for use in insecticidal compositions as synergists for the insecticidal effectiveness of pyrethins, allethrin and other insecticidally active compounds closely related to pyrethins and allethrin, for instance, cyclethrin and furethrin.

The invention includes new synergistic compounds per se, and an effective method for producing them and also includes insecticidal compositions containing pyrethins, allethrin or the like synergized by one or more of my new compounds.

The new compounds of my present invention may be characterized structurally as being composed of a 3,4-methylenedioxybenzyl group connected through an ether oxygen to an alcohol radical of an alcohol of the formula R-[-O-$(CH_2)_m$]$_n$-OH, R representing an alkyl radical of 1 to 4 carbon atoms, $m$ being an integer 2 or 3 and $n$ being an integer 1 or 2.

The invention, as just noted, provides a highly effective method for producing these new compounds. I have also discovered that my new process is highly effective for producing 3,4-methylenedioxyphenyl propyl thioethyl alkoxy ethers of the structural formula:

(1)

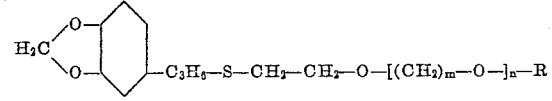
—$C_3H_6$—S—$CH_2$—$CH_2$—O—[$(CH_2)_m$—O—]$_n$—R in which R, $m$ and $n$ have the previously-indicated significance.

It has previously been proposed to synthesize compounds of the above structural Formula 1 by reacting a mercaptan of the formula HS—$(C_nH_{2n}$—O—)$_m$—R with a 3,4-methylenedioxyphenyl-propylene, such as safrole or isosafrole, R being a univalent radical of the group consisting of alkyl, aryl, alkaryl and aralkyl radicals, $n$ being an integer 2 or 3 and $m$ being an integer not greater than 3. In carrying out the previously proposed reaction just described, it has appeared necessary that a peroxide catalyst be present in the reaction mixture. Further, the process has not been found to be entirely satisfactory.

I have now discovered that ethers of these 3,4-methylenedioxyphenyl alcohols and alcohols of the above-noted R—[—O—$(CH_2)_m$]$_n$—OH type may be readily and economically produced by reacting piperonyl alcohol or safrole thioethyl alcohol, i.e., 1-(3,4-methylenedioxyphenyl)-4-thia hexyl alcohol, or isosafrole thioethyl alcohol, i.e., 1-(3,4-methylenedioxyphenyl)-3-thia-2-methyl pentyl alcohol, with a halide of the general formula R—[—O—$(CH_2)_m$]$_n$X, in which R represents an alkyl radical of from 1 to 4 carbon atoms, $m$ is an integer 2 or 3, $n$ is an integer 1 or 2 and X a halogen atom, chlorine, bromine or iodine, for instance, an alkoxyethyl halide or an alkoxyethoxyethyl halide.

The safrole thioethyl alcohol or isosafrole thioethyl alcohol for use in this reaction may, with advantage, be produced by heating 162 grams (1 mole) of safrole, or of isosafrole, with 100 grams (1.25+ mole) of mercaptoethanol at about 130° C. for a period of 4 or 5 days, distilling off most of the excess mercaptoethanol at reduced pressure while maintaining the temperature at about 130° C., cooling the batch and removing any remaining unreacted mercaptoethanol by washing it, in benzene solution, with an aqueous solution of about 5 grams of sodium hydroxide, or similar base, followed by several extractions with water to neutral reaction. The benzene is then distilled from the reaction mixture at reduced pressure. I have, by this method, obtained as the product the calculated yield of 240 grams±8 grams, depending upon the temperature and duration of heating.

Though in the procedure just described, I have indicated a temperature of approximately 130° C., the reaction has been found to proceed satisfactorily both at higher temperatures and at lower temperatures, the temperature and time factors appearing to be interdependent, e.g., at lower temperature, a longer heating period will usually be required to complete the reaction.

In its broader aspect, the invention is not restricted to any particular source of the piperonyl alcohol or source of, or method of producing, the safrole thioethyl alcohol or isosafrole thioethyl alcohol. However, especially advantageous results have been obtained through the use of the thioethyl alcohols prepared as just described.

For effecting the reaction of the piperonyl alcohol or the thioethyl alcohols with the previously described halides, in accordance with my present invention, the alcohol and the halide, in substantially equal molar proportions, are heated together with a base, advantageously sodium hydroxide, and in a volatile inert solvent with refluxing over a water trap until no more water is collected in the trap. This may require from 10 to 12 hours depending upon the rate of heating. Additional sodium hydroxide and a small amount of water may then be added and the heating continued with refluxing until the collection of water in the trap has again ceased, this further heating usually requiring about 12 hours.

It will be recognized, of course, that reaction between the alcohol and the halide will result in the liberation of the halide acid which is neutralized by the sodium hydroxide, to give the sodium halide and water. This neutralizing of the acid and the elimination of the water are necessary to promote the desired reaction. The proportion of base used should be adequate for that purpose.

I have found that the above-described alcohols may be caused to react substantially completely with the above-described halide, yielding superior insecticidal synergists, by heating the two together in the presence of sodium hydroxide, or other alkali metal hydroxide, for neutralizing the halide acid liberated by the reaction, and concurrently eliminating water from the reaction mixture.

I have, with advantage, used sodium hydroxide chips as the neutralizing agent and have effected removal of water from the reaction mixture by carrying on the reaction in the presence of a volatile, nonreactive solvent, such as benzene, with refluxing over a water trap, the heating and refluxing being continued until no more water is collected in the trap. Though azeotropic distillation is an effective means for eliminating the water, the water may, with advantage, be removed by distillation at subatmospheric pressure.

To assure completion of the reaction, I have usually found it advantageous, as previously described, to add additional sodium hydroxide and a small amount of water to the reaction mixture following the above-described steps, breaking-up or loosening the salt mass by agitation, and again heating the mixture for a similar period of time or until no more water is collected in the trap.

Thereafter, the remaining benzene solution of the reaction product is washed with water for removal of the alkali metal salt and the benzene is then distilled off at reduced pressure. Any excess halide, e.g., alkoxyethyl halide or alkoxyethoxyethyl halide remaining in the product may then be distilled off by further heating at reduced pressure.

Though any of the halides represented by the foregoing formula may be used in practicing this invention, I presently prefer to use a halide in which the halogen is chlorine, since they are usually more readily and more economically available. Exceptionally effective synergists have been produced using butoxyethoxyethyl chloride or ethoxyethoxyethyl chloride or butoxyethyl chloride, i.e., halides in which R is an alkyl radical of 2 to 4 carbon atoms.

The invention will be further illustrated by the following specific examples.

Example I 60 grams of safrole thioethyl alcohol, prepared as previously described herein, 56 grams of butoxyethoxyethyl chloride and 12 grams of sodium hydroxide chips were mixed and heated with refluxing in 50 cc. of benzene, using a water trap, until no more water was collected in the trap, this requiring about 11.5 hours. 5 grams of additional sodium hydroxide chips and 5 grams of water were then added, the mixture stirred and the refluxing continued until no more water was collected in the trap; this additional heating period was about 12 hours.

The benzene solution of the product was then washed with water to free the product from sodium chloride formed in the reaction and the benzene was then distilled from the product at reduced pressure. Excess butoxyethoxyethyl chloride was then distilled from the product at reduced pressure resulting in a yield of 90.5 grams of 3,4-methylenedioxyphenyl propyl thioethyl butoxyethoxyethyl ether. This yield was equivalent to about 94.2% of the theoretical yield of 96 grams.

At a concentration of 300 milligrams of the product of Example I and 30 milligrams of pyrethrins in 100 cc. of odorless base oil, the insecticidal composition when tested by the Peet-Grady method against houseflies showed a knockdown of 86.6% and a kill of 75.8%, as compared with an OTI knockdown of 95.5% and a kill of 33.2%.

Example II

In this operation, 60 grams of isosafrole thioethyl alcohol, prepared as described above, and 55 grams of butoxyethoxyethyl chloride and 12 grams of sodium hydroxide chips were mixed and heated with refluxing as described in Example I in 50 cc. of benzene until no more water was collected in the trap, this refluxing operation requiring 11¾ hours. The remaining mixture was then stirred and warmed with 2 cc. of water to loosen the salt mass, and the refluxing continued for an additional 11¼ hours, at which time no additional water was coming off.

The remaining benzene solution was then washed with water for removal of salt and the benzene was distilled therefrom at reduced pressure. Excess butoxyethoxyethyl chloride was then removed from the reaction mass by distillation at reduced pressure, yielding 90.5 grams of 3,4-methylenedioxyphenyl isopropyl thioethyl butoxyethoxyethyl ether, this yield being equivalent to 94.2% of the theoretical yield of 96 grams.

At a concentration of 300 milligrams of the product of Example II and 30 milligrams of pyrethrins in 100 cc. of odorless base oil, there was obtained a knockdown of 95.6% and a kill of 94.2%, by the Peet-Grady method against houseflies, as compared with an OTI knockdown of 95.5% and a kill of 33.2%. A repeat test by the Peet-Grady method of the insecticidal composition, synergized by the product of Example II and of the concentrations just noted, showed a knockdown of 95% and a kill of 94%.

A further test of an insecticidal composition consisting of 500 milligrams of the product of Example II and 50 milligrams of allethrin in 100 cc. of odorless base oil showed a knockdown of 88% and a kill of 68%.

In even lower concentrations, this synergist has been found to be highly effective both with respect to pyrethrins and allethrin. At concentrations of 200 milligrams of the product of this example and 25 milligrams of pyrethrins per 100 cc. of base oil, when tested as above described, showed a knockdown of 89% and a kill of 75%, as compared with the OTI knockdown of 96% and a kill of 46%. At concentrations of 500 milligrams of this product and 50 milligrams of allethrin per 100 cc. of the base oil, there was obtained a knockdown of 94% and a kill of 88% as compared with the OTI knockdown of 96% and a kill of 53%.

Example III

In this operation, 60 grams of isosafrole thioethyl alcohol, produced as heretofore described herein, 45 grams of ethoxyethoxyethyl chloride and 12 grams of sodium hydroxide chips and 2 cc. of water were mixed and heated with refluxing in 70 cc. of benzene over a water trap until no more water was collected in the trap, this refluxing was continued for a period of 22 hours. The resultant benzene solution was then washed with water and the benzene distilled off at reduced pressure. Excess ethoxyethoxyethyl chloride was then distilled from the product at reduced pressure, yielding 89 grams of 3,4-methylenedioxyphenyl isopropyl thioethyl ethoxyethoxyethyl ether, this yield agreeing with the calculated yield.

An insecticidal composition consisting of 300 milligrams of the product of Example III and 30 milligrams of pyrethrins in 100 cc. of odorless base oil, when tested against houseflies by the Peet-Grady method, showed a knockdown of 77.3% and a kill of 67.2%, as compared with an OTI knockdown of 82% and a kill of 32.9%.

Example IV

In this operation, 60 grams of isosafrole thioethyl alcohol, prepared as heretofore described, 36 grams butoxyethyl chloride, 12 grams of sodium hydroxide chips and 2 cc. of water were mixed and heated with refluxing, as described in Example I, in 50 cc. of benzene until no more water was collected in the trap, the refluxing being continued for 32 hours. The benzene solution was then water-washed free of salt and the benzene and excess butoxyethyl chloride were then distilled from the product at reduced pressure yielding 82 grams of 3,4-methylenedioxyphenyl isopropyl thioethyl butoxyethyl ether, this yield being 96% of the theoretical yield of 85 grams.

An insecticidal composition consisting of 300 milligrams of the product of Example IV and 30 milligrams of pyrethrins in 100 cc. of odorless base oil, when tested against houseflies by the Peet-Grady method, showed a knockdown of 75.5% and a kill of 67.8%, as compared with the OTI knockdown of 82% and a kill of 32.9%.

Example V

In this operation, 38 grams of piperonyl alcohol, 55 grams of a butoxyethoxyethyl chloride, 12 grams of sodium hydroxide chips and 2 grams of water were mixed and heated for 45 minutes at 90° C., at the end of which period no lumps were discernible in the mixture. There was then added 50 cc. of benzene and the mixture heated with refluxing over a water trap until no more water collected in the trap, requiring 23½ hours. The product was then washed with water and the benzene was removed by distillation at reduced pressure. Excess butoxyethoxyethyl chloride was then distilled off at reduced pressure, leaving 67 grams of the product, which was 93% of the calculated 74 grams.

At a concentration of 300 miligrams of the product of the foregoing example and 30 miligrams of pyrethrins per 100 cc. of odorless base oil, when tested by the Peet-Grady method against houseflies, showed a knock-down of 95.7% and a kill of 94%, as compared with the OTI knockdown of 96.1% and kill of 53.9%. In an insecticidal composition containing 500 milligrams of this product and 50 milligrams of allethrin per 100 cc. of base oil, when similarly tested, gave a knockdown of 95% and a kill of 56%.

It will be understood that the OTI, i.e., Official Test Insecticide, referred to herein, was composed of 100 milligrams of pyrethrins dissolved in 100 cc. of an odorless base oil of the type conventionally used as the vehicle in such insecticidal compositions.

I claim:

1. Method for producing chemical compounds of the formula R'—O—[—(CH$_2$)$_m$—O—]$_n$—R in which R is an alkyl radical of from 1 to 4 carbon atoms, $m$ is an integer from 2 to 3, $n$ is an integer from 1 to 2 and R' is a monovalent radical selected from the group consisting of the piperonyl alcohol radical, the 1-(3,4-methylenedioxyphenyl) 4-thia hexyl radical and the 1-(3,4-methylenedioxyphenyl)-3-thia-2-methyl pentyl radical, which comprises reacting, at an elevated temperature, a mixture of the R' alcohol and a halide of the formula

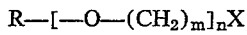

R, $m$ and $n$ having the above-noted significance, and X representing a halogen atom, in the presence of a base to neutralize the halide acid liberated by the reaction and eliminating the water by vaporization from the reacting mixture.

2. Method of producing chemical compounds of the formula

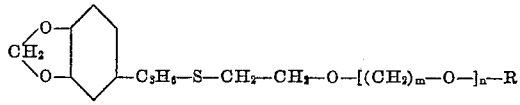

in which R is an alkyl radical of from 1 to 4 carbon atoms, $m$ is an integer from 2 to 3 and $n$ is an integer from 1 to 2, which comprises reacting, at an elevated temperature, a mixture of 3,4-methylenedioxyphenyl propyl thioethyl alcohol and a halide of the formula

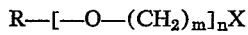

R, $m$ and $n$ having the above-noted signficance and X representing a halogen atom, in the presence of a base to neutralize the halide acid liberated by the reaction and eliminating water by vaporization from the reacting mixture.

3. The method of claim 1 in which the halide acid is neutralized by including in the reaction mixture an alkali metal hydroxide to react therewith to form a salt and the salt is thereafter water-washed from the reaction product.

4. The process of claim 1 in which the halide acid is neutralized by including in the reacting mixture an alkali metal hydroxide and water is eliminated from the reacting mixture by azeotropic distillation with refluxing over a water trap.

5. The process of claim 1 in which the halide is butoxyethoxyethyl chloride.

6. The process of claim 1 in which the halide is ethoxyethoxyethyl chloride.

7. The process of claim 1 in which the halide is butoxyethyl chloride.

References Cited in the file of this patent

UNITED STATES PATENTS

| | | |
|---|---|---|
| 2,485,681 | Wachs | Oct. 25, 1949 |
| 2,946,806 | Nentwig et al. | July 26, 1960 |

OTHER REFERENCES

Merck Index, 6th ed. (1952), pages 548 and 843.